Oct. 18, 1932.  J. F. MOSHER ET AL  1,883,394
CLUTCH
Filed May 24, 1930    4 Sheets-Sheet 2

Inventors:
James F. Mosher
George N. Van Derhoef
Wilson, Dowell, McCanna & Rehm Attys Oct. 18, 1932.  J. F. MOSHER ET AL  1,883,394
CLUTCH
Filed May 24, 1930   4 Sheets-Sheet 3

Inventors:
James F. Mosher
George N. Van Derhoef

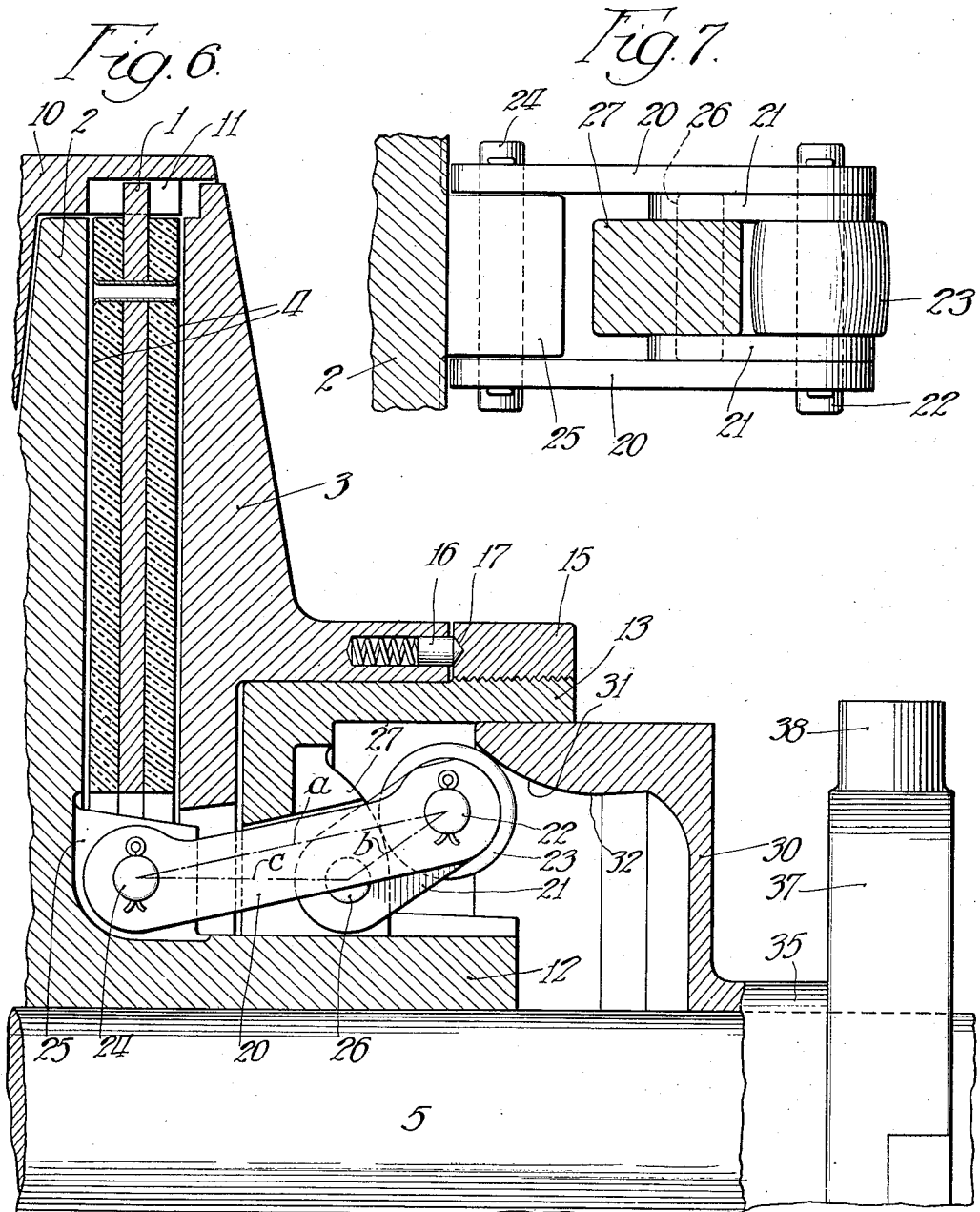

Patented Oct. 18, 1932

1,883,394

UNITED STATES PATENT OFFICE

JAMES F. MOSHER, OF MISHAWAKA, AND GEORGE N. VAN DERHOEF, OF SOUTH BEND, INDIANA, ASSIGNORS TO DODGE MANUFACTURING CORPORATION, OF MISHAWAK. INDIANA, A CORPORATION OF DELAWARE

CLUTCH

Application filed May 24, 1930. Serial No. 455,213.

This invention aims to provide an improved friction clutch.

A clutch of one practicable construction embodying the invention is shown for illustration in the accompanying drawings, by reference to which the invention will be readily understood.

In said drawings:

Fig. 6 is a partial sectional view showing the clutch in released condition.

Fig. 7 is a detail plan view of one of the toggles embodied in the clutch, this view being taken below the line 7—7 of Fig. 1.

Figure 3:
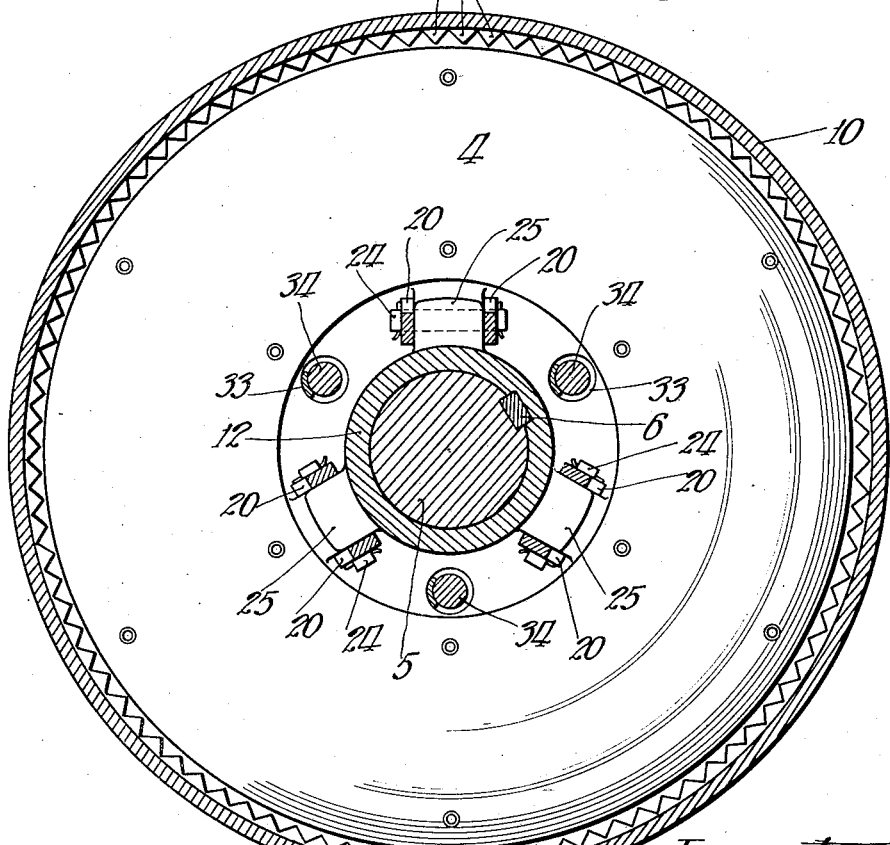
Fig. 3 is a section taken on the line 3—3 of Fig. 1, looking in the direction of the arrow.
Figure 4:
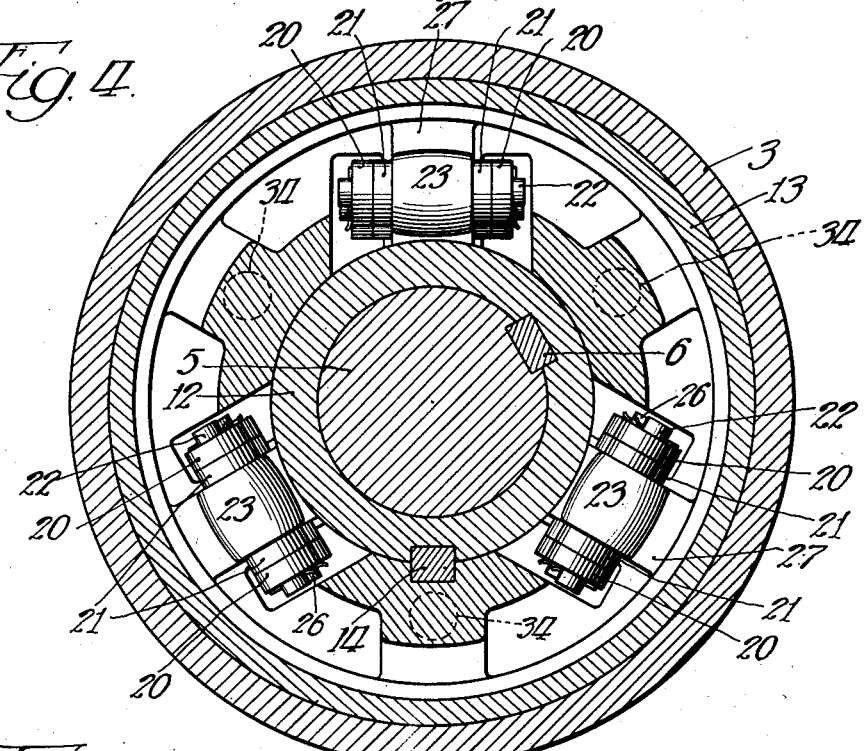
Fig. 4 is a section taken on the line 4—4 of Fig. 1, looking in the direction of the arrow.

The illustrative clutch comprises a friction disc 1 arranged between and adapted to be gripped by a pair of clutch members 2 and 3. The friction disc is shown as an annular steel plate having facings 4 of fiber or other suitable material to provide friction surfaces for coaction with the confronting friction faces of the clutch members 2 and 3. As shown in this instance, the clutch member 2 is fast on a shaft 5, being keyed thereto by the key 6 which is shown in Figs. 3 and 4. The confronting clutch member 3 is movable axially in relation to said clutch member 2 and cooperative therewith to bind or clamp the interposed friction disc. The friction clutch means represented by said disc may if desired comprise a multiple of friction discs.

Figure 2:
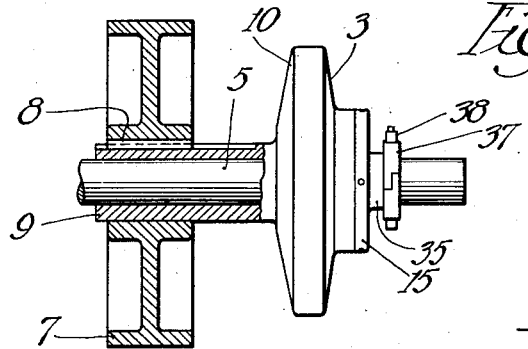
Fig. 2 represents the clutch with an associated pulley to be clutched thereby to a shaft, the clutch being in elevation and the pulley in section.

The clutch members 2 and 3 exemplify members coactive for clutching action to establish driving connection between the rotary machine elements which are intended to be coupled and uncoupled by the clutch. They coact in this instance through the interposed friction disc which is connected with one of said machine elements while the member 2 is connected with the other. Such machine elements are represented by the shaft 5 and a pulley 7 loose on the shaft, which pulley is shown in Fig. 2. The shaft is in driving connection with the clutch member 2 by the key 6, and the pulley 7 is in driving connection with the friction disc by means such for example as shown in Figs. 2 and 3 where the pulley hub is secured by the key 8 to a sleeve 9 loose on said shaft, said sleeve having a bell-shaped extension 10 which encloses and holds the rim of the friction disc and operatively connects therewith through internal projections 11 of said extension engaging notches in the rim of the disc.

It will be understood that when the clutch is released by recession of the clutch member 3 from the friction disc, the pulley 7 is thereby uncoupled from the shaft and free to rotate idly; but when the clutch is applied by the clamping of the friction disc between the clutch members 2 and 3 the pulley is thereby coupled with the shaft for power transmission purposes. The shaft may be either a driving or driven shaft, according to whether the power is transmitted from the shaft to the pulley or vice versa.

The clutch member 2 has a hub extension 12 hereinafter called the clutch hub. On this hub is slidably fitted a carrying member 13 for the clutch member 3. By means of the spline 14, the said carrying member 13 is caused to rotate with the clutch hub and shaft. An internally threaded ring 15 is screwed on the threaded rear end of the carrying member 13 and abuts against the rear end of the clutch member 3, serving to transmit forward thrust of the carrying member 13 to the clutch member 3 and to transmit backward thrust of the clutch member 3 to the carrying member 13.

Figure 5:
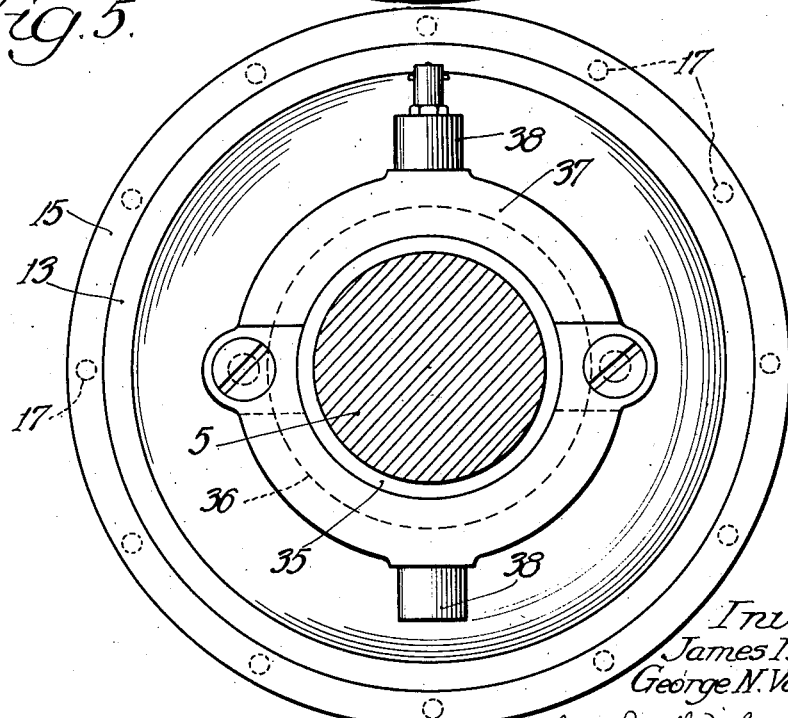
Fig. 5 is an end elevation of the clutch, viewed from the clutch-throw end.

The ring 15 functions as an adjusting nut which may be screwed up or tightened to adjust the clutch member 3 axially in relation to the carrying member 13 if and when necessary to compensate for wear of the friction disc. To permit this adjustment the clutch member 3 has a sliding fit on the carrying member 13. Means for locking the adjusting nut or ring 15 is provided by a spring pressed pin 16 in the clutch member 3 engaging one of a series of equally spaced sockets 17 in the ring. These sockets are shown in dotted lines in Fig. 5. By reason of the form and dimensions of the slightly protruding end of the pin and of the sockets, the pin may be depressed by forcibly turning the ring and will snap into the next socket when it comes around. Thus the ring may be adjusted from time to time by successive equal turns and automatically locked by a snap detent. For engagement of the ring by a spanner wrench, by which to turn it, spanner wrench sockets 18 are shown at diametrically opposite points in the ring.

The sliding carrier 13 for the clutch member 3 is connected with the clutch member 2 by a toggle mechanism operable to force the member 3 toward the member 2 and thereby bind or clamp the interposed friction disc, for applying the clutch; this action being resisted by springs 33 interposed between the clutch members 2 and 3 and which tend to press the member 3 backward or away from the member 2 to release the clutch. The said toggle mechanism, which is centrally arranged and enclosed by the clutch members, comprises in this instance three toggles equally spaced around the clutch hub. These toggles comprise relatively long and short arms arranged at an acute angle. They may be briefly described as "differential toggles", since the straightening of such toggles under the application of power on the toggle joints or knuckles will effect a work movement which is the difference between the versed sines of two angles.

Considering any one of the toggles, a pair of parallel links 20 constitutes the long toggle arm, and an interposed pair of parallel links 21 constitutes the short toggle arm, as shown more clearly in Fig. 7. These toggle arms are pivotally connected at their rear ends by the knuckle pin 22, on which is a roller 23 for engagement by a cam to actuate the toggle. At their forward ends said toggle arms are pivotally connected respectively to the fixed clutch member 2 and to the slidable carrier 13 for the confronting clutch member 3. The connection with the clutch member 2 is provided by a pivot pin 24 passing through the link bars 20 and a lug 25 on said clutch member. Likewise the connection with the slidable member 13 is provided by a pivot pin 26 passing through the link bars 21 and a lug 27 on said slidable member. It will be observed that this type of toggle occupies scarcely more room than the longer toggle arm, thus contributing to the compactness which characterizes the illustrative clutch.

With the particular arrangement shown, the power applied on the toggle knuckle 23 is transmitted to the load or work at the pivot connection 26 of the short toggle arm to the slidable member 13, which is between the fixed fulcrum 24 and the toggle knuckle 22, so that the application of power on the knuckle roller in a direction tending to straighten the toggle will result in a forward thrust on the slidable member 13, greatly magnified by the leverage advantage of the toggle, thereby forcibly pressing the clutch member 3 against the friction disc 1 and effecting the powerful gripping of the disc by the opposed clutch members.

In Fig. 6, a triangle is formed by the dotted lines $a$, $b$ and $c$, of which $a$ represents the long toggle arm, $b$ represents the short toggle arm, and $c$ is a line connecting the centers of their respective pivot connections 24 and 26 with the clutch member 2 and slidable member 13. Since the dimensions of the arms $a$ and $b$ are constant, it will be apparent that movement of the toggle knuckle 22 in a direction to straighten the toggle will shorten the distance between the pivot connections 24 and 26. As the pivot 24 is fixed, in this instance, the movement of the toggle knuckle will force the pivot 26 along the line $c$ toward the pivot 24. It will be further apparent that as the toggle approaches the straight condition, or in other words as the knuckle 22 approaches the line of centers, the movement of 26 toward 24 increases or accelerates, increasing the pressure exerted on the clutch parts. On the other hand, since the knuckle moves in an arc transcribed by the longer radius arm $a$, and is connected with the movable pivot 26 by the shorter radius arm $b$, which is between the fixed pivot 24 and the knuckle 22, the movement imparted to said pivot pin 26 is a differential movement, as previously alluded to; so that the amount of lineal work movement per degree of angular movement of the toggle knuckle is less than would be the case in an ordinary toggle having similarly dimensioned arms. Consequently the application and release of the clutch is accomplished with a correspondingly lesser lineal movement of the clutch member 3 than would otherwise be necessary, which gives reduced clearances when the clutch is released; and the lesser work movement per degree of angular movement obtained by this toggle, as compared with an ordinary similarly dimensioned toggle, means that with the same power applied on the knuckle a proportionately greater working pressure is exerted. With a comparatively light effort, a very powerful pressure can be exerted, causing the tight jamming of the clutch members 2 and 3 and interposed friction disc 1 together.

Figure 1:
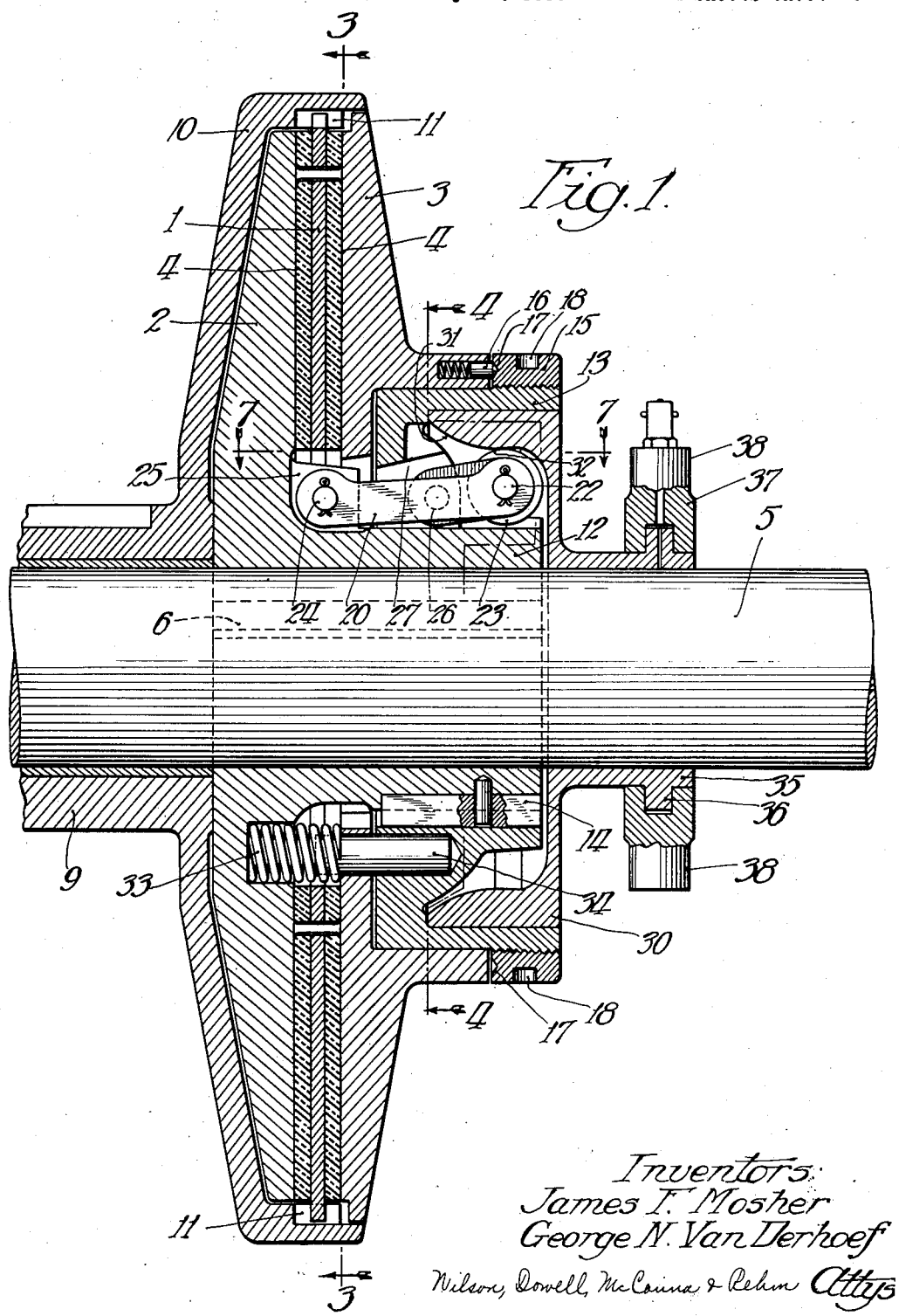
Fig. 1 is a central sectional view of the illustrated clutch.

For actuating the toggles, a cam member 30, operated by a suitable clutch throw means, is slidably fitted in the slidable member 13. This cam member 30, which surrounds the knuckle rollers of the three toggles and cooperates with the clutch members to house the toggles, has an internal annular cam surface 31, which provides the requisite cam surface for coaction with each of the rollers. The cam surface rises from the front toward the back, so that movement of the cam member from the retracted position shown in Fig. 6 to the forward position shown in Fig. 1 will force the knuckle rollers inward or in a direction tending to straighten the toggles. The highest point of the cam surface is immediately in advance of the vertical line of the centers of the knuckle rollers when the cam member is in its full forward position. Hence when the toggles have been actuated to apply the clutch, the rollers bear on the cam surface just behind the highest point of the surface, indicated at 32. This effectively locks the cam member, sufficiently to prevent any accidental backward movement thereof and consequent unintentional release of the clutch. Yet it does not render it difficult to retract the cam member by the clutch throw means when it is desired to release the clutch.

It will be observed that the cam member is locked before the centers of the toggle knuckles 22 reach the line of centers of the pivot pins 24 and 26, or in other words the locking is not done by forcing the toggle knuckles beyond a line of dead centers; hence no great extra pressure has to be overcome to effect the unlocking, and it is unnecessary to provide a mechanical release.

In the retracted position of the cam shown in Fig. 6, the long links 20 bear against the lugs 27 and the slidable member 13 which provide stops to limit the outward movement of the rollers when the cam is retracted. It will be apparent therefore that even if the clutch throw movement were of such extent as to retract the cam from contact with the rollers, the rollers would remain in position for re-engagement of the cam when moved from the retracted position to the forward position.

Immediately upon retraction of the cam member 30, release of the clutch is induced by the springs 33 acting between the clutch members 2 and 3. These are shown as stout coil springs under compression, seated in recesses therefor in the clutch member 2 and bearing against the clutch member 3. The ends of the springs which bear against the clutch member 3 enclose and are centered by the projecting ends of the pins 34. These pins are fitted in recesses therefor in the slidable carrying member 13 and extend through registering openings in the clutch member 3. Besides functioning to center the free ends of the springs, the pins secure the slidable carrier 13 and clutch member 3 against relative rotative movement, or in other words they establish a driving connection between the clutch member 3 and its carrier 13 which in turn is in driving connection with the clutch hub through the spline 14.

The cam member 30 has an integral rearward extension in the form of a short sleeve 35 loosely fitting the shaft, the sleeve being formed with an external rib or shoulder 36 engaged by a swiveled collar 37 having diametrically opposite trunnions 38 for engagement by the yoked end of any suitable clutch throw lever (not shown). As will be apparent from Figs. 5 and 6, the collar 37 is of two-part construction to permit its application to the cam sleeve.

It will be apparent that the illustrative construction provides a clutch of highly practicable and efficient character, and one which is well adapted for use in high speed machinery and power transmissions. The character of the clutch is such that it may be used for a long period of service without necessity of adjustment to take up wear of the friction surfaces. When adjustment is necessary it may be easily accomplished by simply turning the adjusting nut or ring 15 the distance from one notch or socket to the next. It will be noted that the adjustment merely affects the axial relation of the clutch members 2 and 3, or more specifically the axial relation of the clutch member 3 to its carrier 13, without in the slightest degree affecting the relative shift of the operating elements. There being no effect upon the throw, the clutch is well adapted for installations employing a mechanical operator for throwing in and out the clutch.

Among other advantageous characteristics the operating elements comprising the toggle mechanism, the actuating cam and the spring releasing means, are wholly enclosed by the confronting disc clamping clutch members, and the cam member 30 is complemental to the clutch member 3 to furnish with the clutch members a complete housing for the contained elements. Also the construction is such that the advantage of an enclosed type of clutch may be obtained in a duplex organization; it being obvious that two of the illustrative clutches could be reversely arranged on the same shaft and operated by the same clutch throw device, one clutch being applied while the other is released, and there being no necessity in such an organization to expose the contained mechanism of either clutch.

The combined advantages of a compact mechanism of enclosed type, strong, practicable construction and efficient clutching action, are realized in the illustrative clutch largely through the employment of the differential toggles snugly arranged around the clutch hub and connected and operating in a manner to draw the opposing clutch members together.

As hereinbefore indicated, the toggle thrust on the slidable carrier 13 for the clutch member 3 is imparted to said clutch member through the adjusting ring 15, and the opposing pressure of the springs 33 on the clutch member 3 is likewise transmitted to its carrier 13 through the adjusting ring, so that in both directions the sliding carrier and clutch member 3 move as a unitary part; and the toggle connection with the carrier 13 may accordingly be considered as an indirect connection to the clutch member 3.

Both of the clutch members 2 and 3 being in this instance in driving connection with the clutch hub, either of said members may be considered as a clutch member co-active with the friction disc 1 to establish driving connection between the shaft and pulley or other machine elements to be coupled; while the clutch members 2 and 3 more specifically exemplify cooperating members to grip the disc for establishing such connection. Again the clutch member 2 and the disc 1 may be considered as the co-acting clutch elements and the member 3 as a presser member to force the other two into engagement.

Obviously the present invention is not limited to the particular embodiment herein shown and described. Moreover, it is not indispensable that all the features of the invention be employed conjointly, since various features may be advantageously used in various different combinations and subcombinations to suit the requirements of different types of friction clutches and different installations.

What we claim as our invention, and desire to secure by Letters Patent, is:

1. A friction-disc clutch comprising disc-clamping elements, mechanism enclosed thereby operable to force said elements into disc-clamping action, said mechanism comprising centrally arranged differential toggles, and an actuator therefor comprising an axially movable member mounted in one of said elements and having a cam means to operate the toggle knuckles.

2. A friction-disc clutch comprising disc-clamping elements, an axially movable carrier for one of said elments, a differential toggle connection between said carrier and the other element operable to force the elements into co-action, and a toggle actuator in said carrier.

3. A friction-disc clutch comprising disc-clamping elements, a connecting mechanism operable to force them into co-action, comprising differential toggles, and a cup-shaped member mounted on one of said elements having an internal cam cooperable with the toggle knuckles to actuate said mechanism.

4. A friction-disc clutch comprising disc-clamping elements, interposed springs to separate said elements, an axially movable carrier on which one of said elements is slidably fitted, an adjusting ring establishing a thrust connection between said carrier and element thereon, differential toggles connecting said carrier and the other element, the toggle knuckles being within said carrier, and movable cam means in said carrier for co-action with the toggle knuckles for operating the toggles to force the disc-clamping elements into co-action.

5. A friction clutch comprising cooperable clutch members, an axially movable carrier for one of said members, a differential toggle connection between said carrier and the other member operable to force said members into co-action, spring means opposing operation of the toggle and to release said members from co-action, and a toggle actuating cam cooperable with the toggle knuckles and formed to lock itself in place when the clutch members are forced into co-action.

6. A friction clutch embodying cooperable clutch members, an axially movable carrier for one of said members, a differential toggle having its arms pivotally connected respectively to the carrier and other member and having a knuckle roller, and a cam co-acting with said roller for operating said toggle in a direction to straighten it, said cam having a rising cam surface with its highest point just in advance of the center line of the roller where the cam is in its full foremost position, whereby the roller bears against the cam surface just behind said highest point and thereby locks the cam against accidental backward movement.

7. A friction clutch comprising cooperable clutch members, an axially movable carrier for one of said members, adjusting means between said carrier and member thereon comprising a thrust ring functioning as an adjusting nut, differential toggles having their short and long arms pivotally connected respectively with said carrier and the opposite clutch member, and means in said carrier co-acting with the toggle knuckles for actuating the toggles to force the clutch members into co-action.

In testimony whereof, we have signed our names to this application.

JAMES F. MOSHER.
GEORGE N. VAN DERHOEF.